United States Patent [19] [11] Patent Number: 4,896,569
Ito et al. [45] Date of Patent: Jan. 30, 1990

[54] ELECTRONICALLY CONTROLLED AUTOMATIC TRANSMISSION AND METHOD OF CONTROLLING THE SAME

[75] Inventors: Yasunobu Ito, Okazaki; Yasuo Mizuno, Chiryu, both of Japan

[73] Assignee: Aisin AW Kabushiki Kaisha, Japan

[21] Appl. No.: 207,701

[22] Filed: Jun. 16, 1988

[30] Foreign Application Priority Data

Jun. 26, 1987 [JP] Japan .................................. 62-157559

[51] Int. Cl.$^4$ .............................................. B60K 41/18
[52] U.S. Cl. ..................................... 74/866; 364/424.1
[58] Field of Search ......................... 74/866; 364/424.1

[56] References Cited

U.S. PATENT DOCUMENTS

| 4,561,055 | 12/1985 | McKee | 74/866 X |
| 4,635,508 | 1/1987 | Tatsumi | 74/866 |
| 4,667,541 | 5/1987 | Shimaoka et al. | 74/866 |
| 4,685,051 | 8/1987 | Hattori et al. | 364/424.1 |
| 4,698,764 | 10/1987 | Inagaki et al. | 364/424.1 |
| 4,722,242 | 2/1988 | Miura et al. | 74/695 |
| 4,779,490 | 10/1988 | Milunas et al. | 74/866 X |

FOREIGN PATENT DOCUMENTS

| 0173647 | 10/1982 | Japan | 74/866 |
| 0011753 | 1/1985 | Japan | 74/866 |
| 0004948 | 1/1987 | Japan | 74/866 |
| 0020938 | 1/1987 | Japan | 74/866 |

Primary Examiner—Dirk Wright
Attorney, Agent, or Firm—Lorusso & Loud

[57] ABSTRACT

An electronically controlled automatic transmission in which the transmission gear stage and engaging or disengaging operations of a lock-up clutch in a torque converter are determined on the basis of the number of transmission output revolutions and the throttle opening and in which a shifting solenoid and a lock-up solenoid incorporated in the transmission are controlled in. The transmission has a sensor for detecting an input rotational speed. The number of transmission input revolutions output from this sensor and the number of transmission output revolutions are compared with each other, thereby detecting malfunction of a transmission output speed sensor. If the transmission output speed sensor malfunctions, gearshift and lock-up control are performed on the basis of the number of transmission output revolutions calculated from the number of transmission input revolutions and the corresponding gear ratio. The transmission also has an malfunction alarm device for issuing an alarm indicating malfunction of the transmission output speed sensor in response to a signal output from an electronic control device. When both the transmission output speed sensor and the transmission input speed sensor operate normally, the number of revolutions output from the transmission output speed sensor and the number of transmission output revolutions calculated by the electronic control device from the number of transmission input revolutions and the gear ratio are compared, thereby detecting malfunction such as slip failure of a friction member in the transmission or shift failure.

11 Claims, 6 Drawing Sheets no' = Ni/ig DURING SHIFTING   nob' IMMEDIATELY BEFORE SHIFTING IS HELD GEAR RATIO ig
(EXAMPLE)

| GEAR STAGES | GEAR RATIOS |
|---|---|
| 1st SPEED | 3.50 |
| 2nd SPEED | 2.45 |
| 3rd SPEED | 1.00 |
| 4th SPEED | 0.79 |

| GEAR POSITION / SOLENOID | FIRST | SECOND | THIRD | OD |
|---|---|---|---|---|
| NO. 1 | ○ | ○ | × | × |
| NO. 2 | × | ○ | ○ | × |

○ : ON STATE (ENERGIZED)
× : OFF STATE (NON-ENERGIZED)

D-RANGE ECONOMY SHIFT PATTERN

ELECTRONICALLY CONTROLLED AUTOMATIC TRANSMISSION AND METHOD OF CONTROLLING THE SAME

BACKGROUND OF THE INVENTION

This invention relates to an electronically controlled automatic transmission and a method of controlling the transmission and, more particularly, to an electronically controlled automatic transmission having functions capable of detecting any malfunction of a transmission output speed sensor or vehicle speed sensor used to control the transmission, as well as fail-safe functions associated therewith.

In an electronically controlled automatic transmission with a single vehicle speed sensor of the type already known, there are times when a computer may determine that the vehicle speed is zero even the vehicle is running, if the vehicle speed sensor malfunctions and fails to output a vehicle speed signal. In such a case, the computer determines that the vehicle is in a stationary state and sets the automatic transmission (hereinafter referred to simply as "transmission") to the first speed, which of course impairs the smooth running of the vehicle. One type of system designed to cope with this problem makes use of independent vehicle speed signals supplied via two lines, that is, an output speed signal from a vehicle speed sensor incorporated in the transmission and a speed signal from a vehicle speed sensor incorporated in a speedometer. This provides suitable redundancy and improves the reliability.

As described above, it is necessary for a transmission system to have redundancy by, for example, making use of two vehicle speed signals supplied via different lines in order to avoid any untoward influence on the smooth running of the vehicle due to malfunctioning of one of the speed sensors.

SUMMARY OF THE INVENTION

It is therefore an object of the present invention to provide an electronically controlled automatic transmission and a method of controlling the transmission which are free from the aforementioned problems and are capable of detecting malfunctions of a vehicle speed sensor with accuracy as well as enabling the vehicle to run with safety, the transmission preferably being capable of being produced at low cost.

Reference in this specification to, the number of transmission output revolutions is to be understood as the number of revolutions of a rotary member in an output stage of the transmission such as a differential drive pinion, differential driven gear or parking gear. The number of revolutions of this rotary member is detected by an electromagnetic pick-up type of transmission output speed sensor (including vehicle speed sensor). Similarly, the number of transmission input revolutions is to be understood as the number of revolutions of a rotary member in an input stage of the transmission such as a drum of a first clutch $C_1$. The number of revolutions of this rotary member is detected by an electromagnetic pick-up type of transmission input speed sensor.

To attain the above object, the present invention provides an electronically controlled automatic transmission in which the transmission gear stage and engaging or disengaging operations of a lock-up clutch in a torque converter are determined on the basis of the number of transmission output revolutions and the throttle opening and in which a shifting solenoid and a lock-up solenoid incorporated in the transmission are controlled. The transmission has a sensor for detecting an input rotational speed. Signals representing the number of transmission input revolutions output from this sensor and the number of transmission output revolutions are compared with each other, thereby detecting malfunction of a transmission output speed sensor for outputting the number of transmission output revolutions. If the transmission output speed sensor malfunctions, gearshift and lock-up control are performed on the basis of the number of transmission output revolutions (calculated value) computed by an electronic control device from the number of transmission input revolutions and the corresponding gear stage. The transmission also has a malfunction alarm device for issuing an alarm indicating malfunction of the transmission output speed sensor in response to a signal output from the electronic control device.

The arrangement may be such that, when both the transmission output speed sensor and the transmission input speed sensor operate normally, the number of revolutions output from the transmission output speed sensor and the number of transmission output revolutions calculated by the electronic control device from the number of transmission input revolutions and the gear ratio are compared with each other, thereby enabling the function of detecting malfunction such as slip failure of a friction member in the transmission, or shift failure (the gear stage is not selected in correspondence with the signal from the shifting solenoid). In this case, the malfunction alarm device may indicate the malfunction of the transmission output speed sensor and internal failure of the transmission separately from each other.

The above arrangement in accordance with the present invention ensures the following advantages.

(1) Fail-safe functions based on the transmission output speed signal and the transmission input speed signal can be provided without using two lines for speed sensor outputting the same signals. Of course, a transmission input speed sensor may be disposed for fail-safe control. It is more preferable to add this fail-safe control function to the automatic transmission that requires a transmission input speed sensor originally intended to control slippage of the lock-up clutch. This arrangement is advantageous in terms of cost since it reduces the number of sensors by one compared with the redundancy system using two speed sensor lines.

(2) It is possible to prevent influence of sudden downshifts on a friction member in the transmission, thereby improving the durability thereof.

(3) In the arrangement of the present invention, the transmission gear ratio is calculated from the number of transmission input revolutions and the number of transmission output revolutions, and a state of transmission in which the gear ratio does not coincide with normal values due to some cause such as slipping of a friction member, shift solenoid operation failure, or shift valve operation failure can therefore be regarded as a malfunction and can be detected.

DESCRIPTION OF THE PREFERRED EMBODIMENTS

Preferred embodiments of the present invention will be described below in detail with reference to the accompanying drawings.

Figure 1:
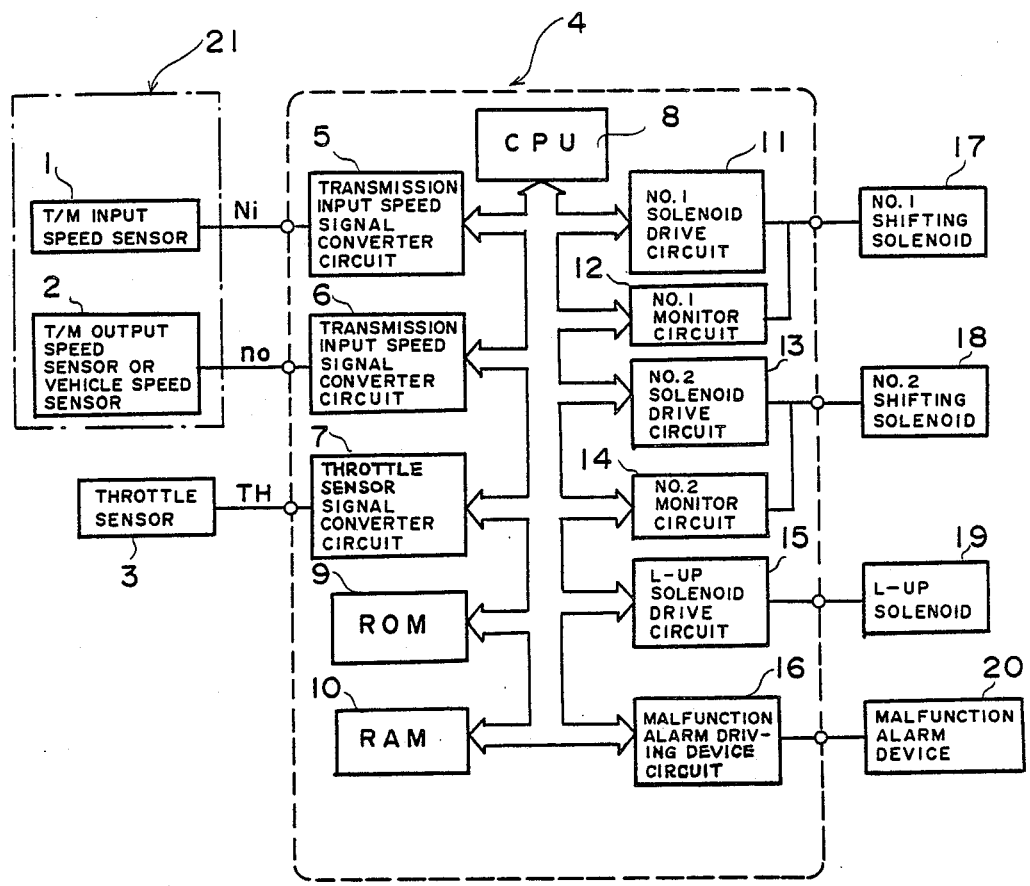
FIG. 1 is a block diagram of a control system of an electronically controlled automatic transmission in accordance present invention.
Figure 2:
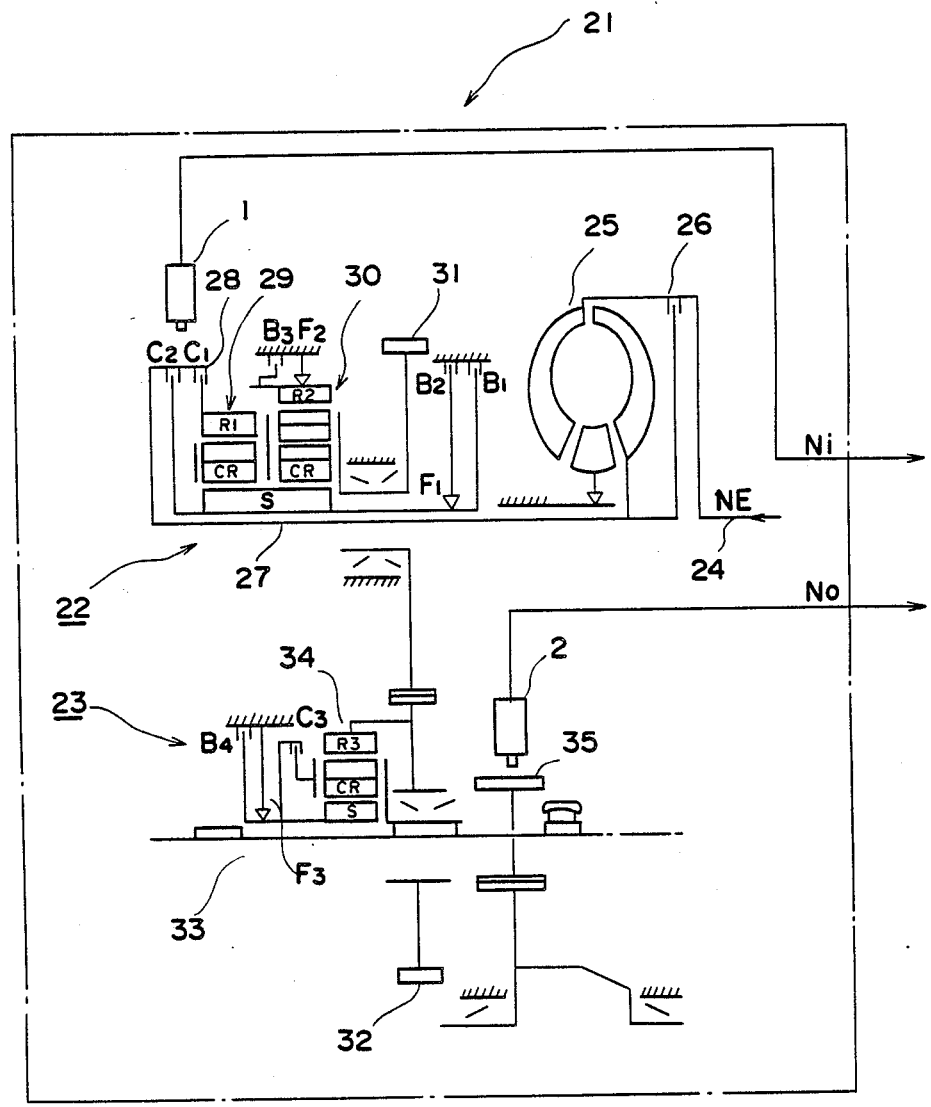
FIG. 2 is a schematic diagram of the transmission relating to system shown in FIG. 1.

Referring to FIG. 1, a transmission input speed sensor 1 is an electromagnetic type of sensor adapted to detect the number of revolutions of, for example, a drum 27 of a first clutch $C_1$, as shown in FIG. 2. A transmission output speed sensor 2 (including a vehicle speed sensor) is an electromagnetic type of sensor adapted to detect the number of revolutions of a differential drive pinion 34. Instead, the sensor 2 may be used to detect the number of revolutions of a differential driven gear or parking gear. Another sensor, a throttle position sensor 3 (hereinafter referred to as "throttle sensor") is also provided. An electronic control unit 4 has: a transmission speed signal converter circuit 5 connected to the transmission input speed sensor 1; a transmission speed signal converter circuit 6 connected to the transmission output speed sensor 2; a throttle sensor signal converter circuit 7; a CPU (Central Processing Unit) 8; a ROM (Read Only Memory) 9 in which control programs and various items of data are stationarily stored; and a RAM (Random Access Memory) 10 in which data read from the ROM 9 and temporary input-output data are stored; a first solenoid driving circuit 11, a first monitor circuit 12 for monitoring the operation of the first solenoid driving circuit; a second solenoid driving circuit 13; a second monitor circuit 14 for monitoring the operation of the second solenoid driving circuit; a lock-up solenoid driving circuit 15; a malfunction alarm device driving circuit 16. Correspondingly, a first shifting solenoid 17, a second shifting solenoid 18, a lock-up solenoid 19 and a malfunction alarm device 20 are provided.

A transmission 21 has a main transmission mechanism (three speed automatic transmission mechanism) portion 22 and a sub transmission mechanism portion 23, as shown in FIG. 2. Components of the transmission are disposed as described below. A shaft 24 connected to a crankshaft of the engine, a hydrodynamic torque converter 25, a lock-up clutch 26, an input shaft 27 are successively disposed from a side of the engine. A first (forward) clutch $C_1$ has a drum 28 directly connected to the input shaft 27. A single gear unit 29, a dual gear unit 30 and a counter drive gear 31 are provided around the input shaft 27. Around a counter shaft 33 are provided a counter driven gear 32, a planetary gear unit 34, and a differential drive pinion 35. A second (direct) clutch $C_2$, a first brake $B_1$, a first one-way clutch $F_1$, a second brake $B_2$, a third brake $B_3$, a second one-way clutch $F_2$, a fourth one-way clutch $F_3$, and a fourth (U/D (under-drive) direct) clutch $C_3$, and a fourth (U/D) brake $B_4$ are also provided.

The transmission gear stage and engaging or disengaging operations of the lock-up clutch in the torque converter are determined from the number of transmission output revolutions $n_o$ detected by the transmission output speed sensor 2 and the throttle opening TH detected by the throttle sensor 3, and the first and second solenoids 17 and 18 and the lock-up solenoid 19 incorporated in the transmission are controlled in the on-off manner. Furthermore, in accordance with the present invention, the transmission input speed sensor 1 is provided in order to detect a transmission input speed. The number of transmission input revolutions $N_i$ detected by the sensor 1 and the number of transmission output revolutions $n_o$ are compared with each other, thereby determining whether or not malfunction of a value indicating the number of transmission output revolutions $n_o$ occurs. If it is normal, the shifting solenoid is operated on the basis of the number of transmission output revolutions $n_o$, thereby effecting the gearshift. Also, the lock-up solenoid 19 is operated so as to perform lock-up control.

Figures 3, 4:
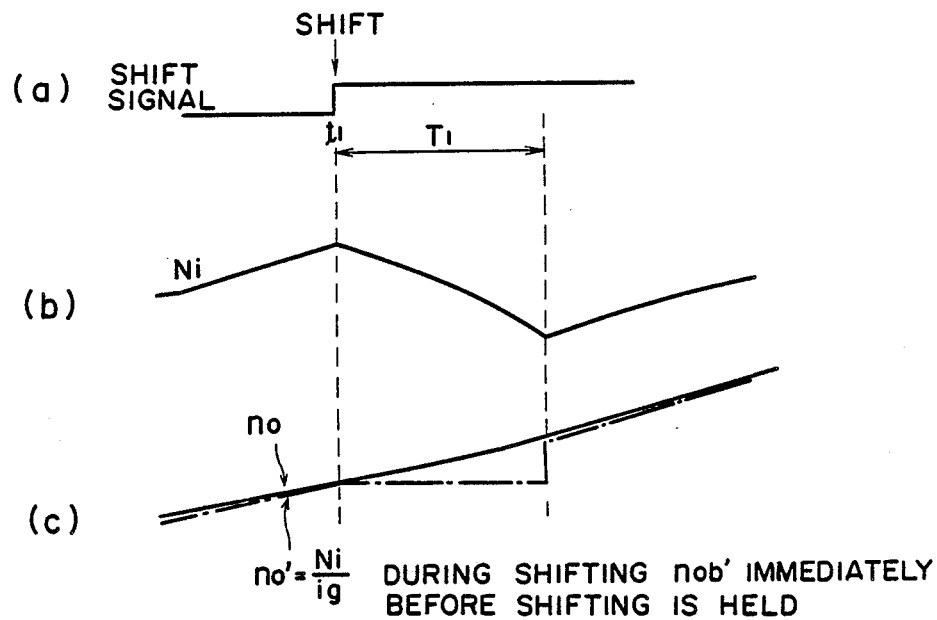
FIG. 3 is a diagram of changes in the number of transmission revolutions No during shifting.
FIG. 4 is a diagram of an example of a set of gear ratios.

If malfunction of the signal representing the number of transmission output revolutions $n_o$ occurs, the gearshift is performed in accordance with the number of transmission output revolutions $n_o'$ calculated on the basis of the number of transmission input revolutions Ni and a gear ratio ig obtained from the states of the shifting solenoids at the corresponding time, that is, $n_o' = Ni/ig$, and the lock-up control is thereafter performed. In a case where, during this control, the transmission is in a shifting state, a signal representing the number of transmission output revolutions $n_{ob}'$ obtained immediately before the gearshift as shown in FIG. 3 is used to perform the control if malfunction of the signal representing the number of transmission output revolutions $n_o$ occurs during the shifting operation, since in this case the gear ratio ig is not 1 : 1. In more detail, if the shift signal rises at time $t_1$ as shown in FIG. 3 at (a), the number of transmission input revolutions Ni is changed as shown in FIG. 3 at (b). Then, if malfunction of the signal representing the transmission output revolutions $n_o$ indicated in FIG. 3 at (c) occurs, the number of transmission output revolutions $n_o'$ calculated is used. During shifting, however, the transmission output revolutions $n_{ob}'$ are immediately before the shift is held and used to perform the control. FIG. 4 shows a example of a set of gear ratios: 3.50 at the first speed gear stage; 2.45 at the second speed gear stage; 1.00 at the third speed gear stage; and 0.79 at the fourth speed gear stage.

Figure 5:
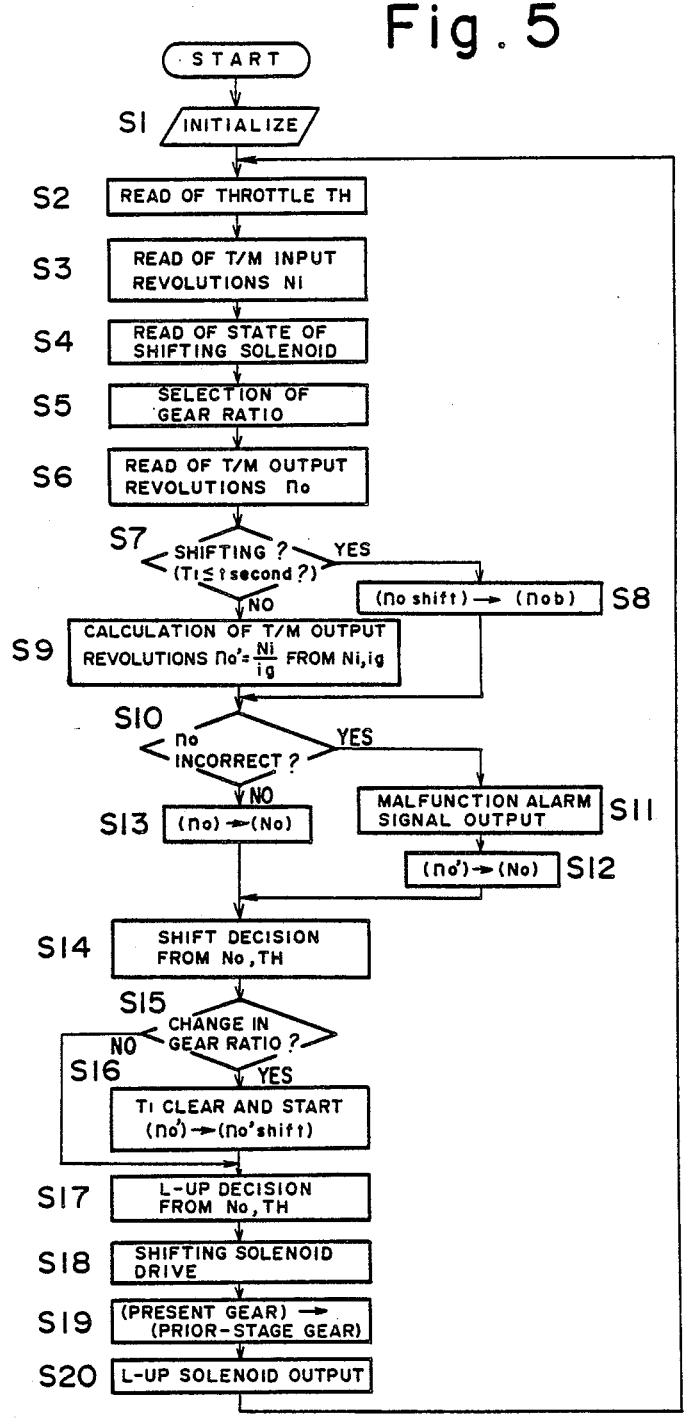
FIG. 5 is operational flowchart of an electronically controlled automatic transmission which represents a first embodiment present invention.

The operation of the first embodiment based on a control program stored in the ROM 9 and executed by the CPU will now be described with reference to the operational flowchart of FIG. 5.

Figures 7, 8:
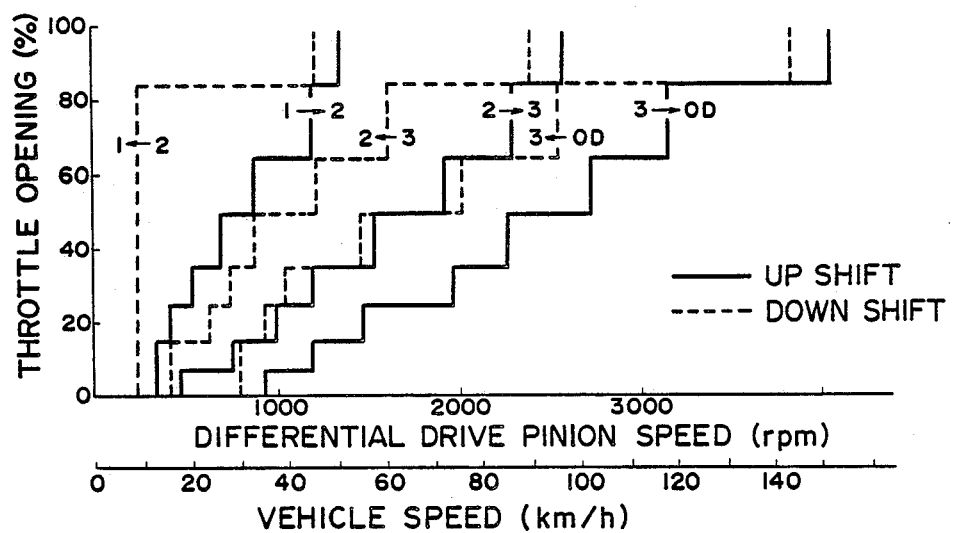
FIG. 7 is a table of states of operations of shifting solenoids.
FIG. 8 is a shift diagram showing a D-range economy shift pattern.

In step S1, the electronic control unit 4 is first initialized. In step S2, the throttle opening TH output from the throttle sensor 3 is read and is stored in the RAM 10. In step S3, the number of transmission input revolutions Ni output from the transmission input speed sensor 1 is read and is stored in the RAM 10. Then, in step S4, the states of the shifting solenoids are read through the monitor circuit 12 for the first shifting solenoid 17 and the monitor circuit 14 for the second shifting solenoid 18, and the transmission stage is detected from the states of operation of the first and second shifting solenoids shown in FIG. 7. The gear ratio ig is then selected in step S5. For instance, as shown in FIG. 4, 2.45 is selected in the case of the second speed. In step S6, the number of transmission output revolutions $n_o$ is read from the transmission output speed sensor 2 and is stored in the RAM 10. Thereafter, whether or not the transmission is in a shifting state is checked in step S7. This checking is performed on the basis of a decision of whether or not a shifting period $T_1$ from the shifting time $t_1$ with respect to the number of transmission input revolutions Ni as shown in FIG. 3 is equal to or smaller than t. If it is thereby determined that the transmission is shifting, the number of transmission output revolutions $n_{ob}$ immediately before the shift is maintained in step S8. If the transmission is not shifting, the number of transmission output revolutions $n_o'$ is calculated in step S9 on the basis of the number of transmission input revolutions Ni and the gear ratio ig. Then, in step S10, determination is made as to whether or not malfunction has occured in generations of a value representing the number of transmission output revolutions $n_o$ occurs. For example, in a case where pulses representing the number of transmission output revolutions $n_o$ ceases, while N pulses representing the number of transmission input revolutions Ni continue, it is determined that a malfunction exists in detection of the value representing the number of transmission output revolutions $n_o$. If, as a result, the value representing the number of transmission output revolutions $n_o$ is incorrect, a malfunction alarm signal which indicates that the sensor 2 malfunctions is output in step S11. In step S12, the number of transmission output revolutions $n_o'$ calculated in step S9 is used as the number of normal transmission output revolutions No. If it is determined in step 10 that malfunction of the value representing the number of transmission output revolutions $n_o$ has not occured, the number of transmission output revolutions $n_o$ is used as the number of normal transmission output revolutions No in step S13. Then, in step S14, shift decision is made on the basis of the number of normal transmission output revolutions No and the throttle opening TH. That is, a table (such as that shown in FIG. 8) of the number of transmission output revolutions and the throttle opening TH stored in the ROM 9 is referred to, thereby determining whether or not the operation of the transmission corresponds to a shift point. In step S15, decision is made as to whether or not the gear ratio ig has been changed. This decision is made on the basis of the decision of whether or not the present gear ratio is equal to the gear ratio at the time of or before the shift decision. If it is thereby determined that the gear ratio has been changed, the shifting period $T_1$ is cleared in step S16 and after restarting, the number of transmission output revolutions $n_o'$ is used as $n_o'$ shift representing the number of transmission output revolutions during shifting. In Step S17, the lock-up decision is made on the basis of the number of normal transmission output revolutions No and the throttle opening TH table (refer to FIG. 8). In step S18, the first shifting solenoid 17 and/or the second shifting solenoid 18 are driven. Thereafter, in step S19, the present gear ratio is set as the prior-stage gear ratio at the time of the next gear-shift. In step S20, the lock-up solenoid 19 is driven.

Next, a second embodiment will be described below. This embodiment is arranged in such a manner that functions of detecting a malfunction relating to internal mechanisms of the transmission as well as issuing an alarm which indicates the malfunction are added to the control functions of the first embodiment.

In the second embodiment, if the number of transmission output revolutions $n_o$ and the number of transmission input revolutions Ni are normal, the gear ratio obtained from the states of the shifting solenoids (theoretical value) and the actual gear ratio obtained from the number of transmission output revolutions $n_o$ and the number of transmission input revolutions Ni (measured value) are compared with each other. If these values differ from each other, it is determined that there is a malfunction such as slip of a friction member, shifting solenoid operation failure, shift valve operation failure, or malfunction relating to gears, thereby issuing a malfunction alarm.

Figure 6:
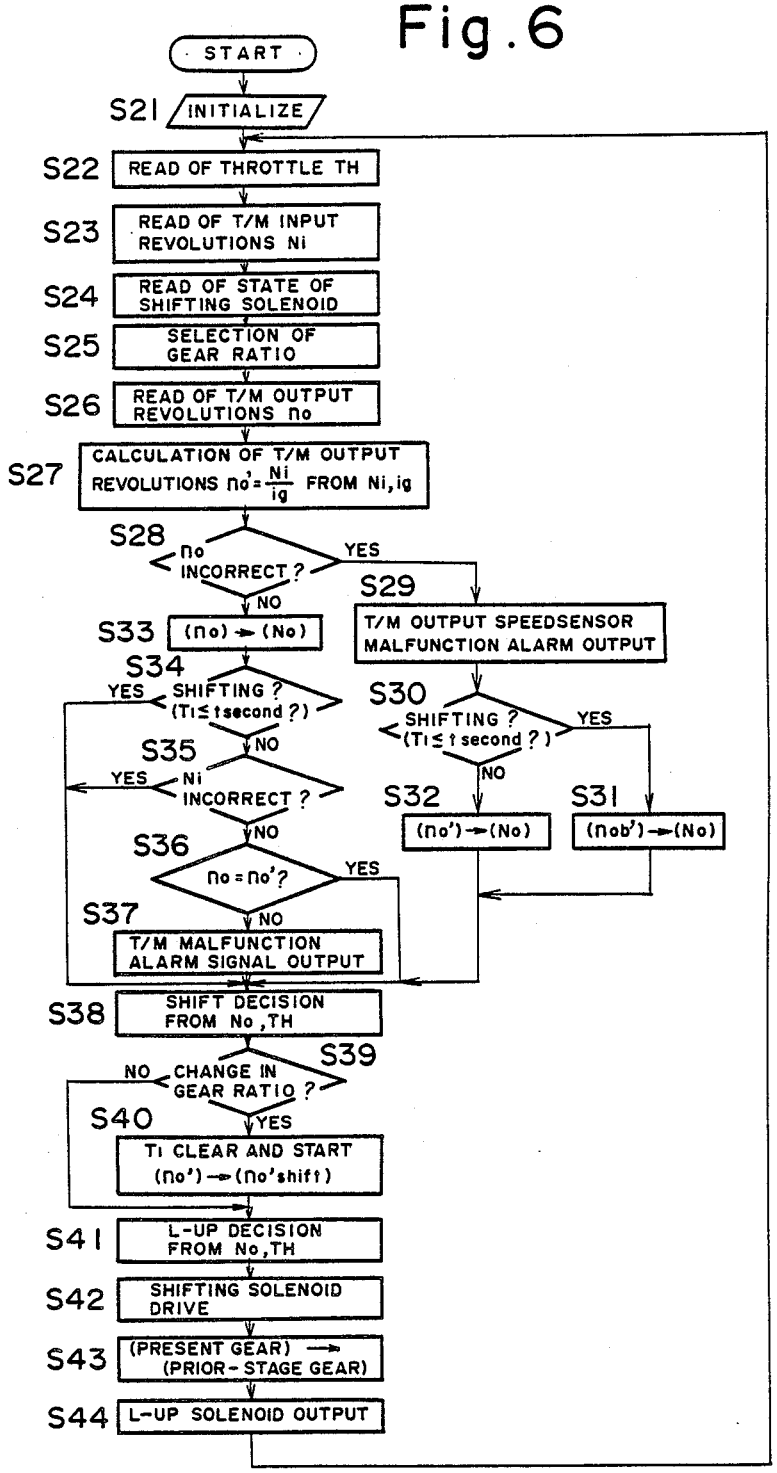
FIG. 6 is operational flowchart of an electronically controlled automatic transmission which represents a second embodiment of the present invention.

A control program for the CPU 8 in accordance with the second embodiment will now be described with reference to the operational flowchart of FIG. 6.

The electronic control unit 4 is first initialized in step S21, and the throttle opening TH is read in step S22. In step S23, the number of transmission input revolutions Ni is read. In step S24, the states of the shifting solenoids are read. In step S25, the gear ratio ig is selected. In step S26, the number of transmission output revolutions $n_o$ is read from the transmission output speed sensor 2. In step S27, the number of transmission output revolutions $n_o'$ is calculated on the basis of the number of transmission input revolutions Ni and the gear ratio ig. In step S28, it is determined whether or not the value representing the number of transmission output revolutions $n_o$ is correct. For example, in a case where the output of pulses representing the number of transmission output revolutions $n_o$ ceases while N pulses representing the number of transmission input revolutions Ni continue, it is determined that a malfunction exists in detection of the value representing the number of transmission output revolutions $n_o$. If, as a result, malfunction of the value representing the number of transmission output revolutions $n_o$ occurs, a malfunction alarm signal which indicates that the sensor 2 has malfunctioned is output in step S29. In step S30, whether or not the transmission is in a shifting state is checked. This checking is performed on the basis of a decision of whether or not a shifting period $T_1$ from the shifting time $t_1$ with respect to the number of transmission input revolutions Ni as shown in FIG. 3 is equal to or smaller than t. If, as a result, the transmission is shifting, the number of transmission output revolutions $n_{ob}'$ immediately before the shift is retained as the number of normal transmission output revolutions No during the shifting, in step S31. If the transmission is not shifting, the number of transmission output revolutions $n_o'$ calculated in step S32 is used as the number of normal transmission output revolutions No. If it is determined in step S28 that the value representing the number of transmission output revolutions $n_o$ is normal, the number of transmission output revolutions $n_o$ is used as the number of normal transmission output revolutions No in step S33. In step S34, whether or not the transmission is shifting is checked as in step S30. If, as a result, the transmission is not shifting, decision is made in step S35 as to whether or not malfunction of the value representing the number of transmission input revolutions Ni occurs. For example, in a case where the output of pulses for the number of transmission input revolutions Ni during supply of N' pulses representing the number of transmission input revolutions $n_o$ ceases, it is determined that malfunction of the value representing the number of transmission input revolutions Ni has occurred. If it is determined that the value is normal, decision is made in step S36 as to whether or not the number of transmission output revolutions $n_o$ is equal to the number of transmission output revolutions $n_o'$ calculated from the number of transmission input revolutions Ni and the gear ratio ig. If, as a result, the number of transmission output revolutions $n_o$ is not equal to the number of calculated transmission output revolutions $n_o'$, an alarm signal indicating a malfunction of internal member of the transmission in step S37, shift decision is made in step S38 from the number of normal transmission output revolutions No and the throttle opening TH, and decision is made in step S39 as to whether or not the gear ratio has been changed. If it is thereby determined that the gear ratio has been changed, the shifting period $T_i$ is cleared in step S40 and after restarting, the number of transmission output revolutions $n_o'$ is used as the number of transmission output revolutions. In step S41, lock-up decision is made on the basis of the number of normal transmission output revolutions No and the throttle opening TH. In step S42, the shifting solenoids are driven. In step S43, the present gear ratio is set as the prior-stage gear ratio at the time of the next gearshift. In step S44, the lock-up solenoid 19 is driven.

The present invention is not limited to the above-described embodiment and other various modifications based on the spirit of the present invention are also possible without departing from the scope of the present invention.

What is claimed is:

1. A method of electronically controlling an automatic transmission in which the transmission gear stage and engaging or disengaging operations of a lock-up clutch in a torque converter are determined on the basis of the number of transmission output revolutions and the throttle opening and in which a shifting solenoid and a lock-up solenoid incorporated in said transmission are controlled, said method comprising the steps of:
    (a) comparing the number of transmission input revolutions and the number of transmission output revolutions with each other;
    (b) determining whether or not the number of transmission output revolutions is abnormal on the basis of the result of said comparison; and
    (c) detecting existence of an internal mechanical failure of said transmission by comparing the number of revolutions output from a transmission output sensor with the number of transmission output revolutions calculated from the number of transmission input revolutions and the gear ratio, if no abnormality is determined to exist.

2. A method according to claim 1, further comprising a step of issuing an alarm indicating existence of internal mechanical failure of said transmission.

3. An electronically controlled automatic transmission in which the transmission gear stage and engaging or disengaging operations of a lock-up clutch in a torque converter are controlled on the basis of the number of transmission output revolutions and the throttle opening and in which a shifting solenoid and a lock-up solenoid incorporated in said transmission are controlled, said transmission comprising:
    (a) an input sensor for detecting the number of transmission input revolutions;
    (b) an output sensor for detecting the number of transmission output revolutions;
    (c) comparison means for comparing the number of detected transmission input revolutions with the number of detected transmission output revolutions;
    (d) determination means for determining whether or not the number of transmission output revolutions is abnormal on the basis of said comparison;
    (e) means for controlling shifting and operation of the torque converter lock-up clutch on the basis of the number of transmission output revolutions calculated from the number of detected transmission input revolutions and the gear ratio of the gear stage selected at the corresponding time, if said determination means determines abnormality; and
    (f) means for detecting existence of an internal mechanical failure of said transmission by comparing the detected number of output revolutions with the calculated number of transmission output revolutions, if said determination means determines normality.

4. An electronically controlled automatic transmission according to claim 3 further comprising means for issuing an alarm indicating existence of an internal mechanical failure of said transmission.

5. An electronically controlled automatic transmission in which the transmission gear stage and engaging or disengaging operations of a lock-up clutch in a torque converter are controlled on the basis of the number of transmission output revolutions and the throttle opening and in which a shifting solenoid and a lock-up solenoid incorporated in said transmission are controlled, said transmission comprising:
    (a) an input sensor for detecting the number of transmission input revolutions;
    (b) an output sensor for detecting the number of transmission output revolutions;
    (c) comparison means for comparing the number of pulses representing the number of transmission input revolutions output from said input sensor with the number of pulses representing the number of transmission output revolutions output from said output sensor;
    (d) determination means for determining whether or not the number of transmission output revolutions is abnormal on the basis of the result of said comparison; and (e) means for controlling shifting and operation of the torque converter lock-up clutch on the basis of the number of transmission output revolutions calculated from the number of transmission input revolutions and the gear ratio of the gear stage selected at the corresponding time, if said determination means determines abnormality.

6. An electronically controlled automatic transmission according to claim 5 further comprising means for detecting existence of an internal mechanical failure of said transmission by comparing the number of revolutions output from a transmission output sensor with the number of transmission output revolutions calculated from the number of transmission input revolutions and the gear ratio, if said determination means determines normality.

7. A method of electronically controlling an automatic transmission in which the transmission gear stage and engaging or disengaging operations of a lock-up clutch in a torque converter are determined on the basis of the number of transmission output revolutions and the throttle opening and in which a shifting solenoid and a lock-up solenoid incorporated in said transmission are controlled, said method comprising the steps of:

(a) comparing the number of transmission input revolutions and the number of transmission output revolutions;
(b) determining whether or not the number of transmission output revolutions is abnormal on the basis of the result of said comparison;
(c) performing shifting and lock-up control on the basis of the number of transmission output revolutions calculated from the number of transmission input revolutions and the gear ratio of the gear stage selected at the corresponding time, if existence of an abnormality is determined; and
(d) detecting existence of an internal mechanical failure of said transmission by comparing the number of revolutions output from a transmission output speed sensor with the number of transmission output revolutions calculated from the number of transmission input revolutions and the gear ratio, if no abnormality is determined to exist.

8. A method according to claim 7, further comprising issuing an alarm indicating existence of internal mechanical failure of said transmission.

9. A method of electronically controlling an automatic transmission in which the transmission gear stage and engaging or disengaging operations of a lock-up clutch in a torque converter are determined on the basis of the number of transmission output revolutions and the throttle opening and in which a shifting solenoid and a lock-up solenoid incorporated in said transmission are controlled, said method comprising the steps of:

(a) detecting the number of transmission input revolutions output from an input sensor;
(b) detecting the number of transmission output revolutions output from an output sensor;
(c) comparing the number of pulses, representing the number of transmission input revolutions, output from said input sensor with the number of pulses, representing the number of transmission output revolutions, output from said output sensor;
(d) determining whether or not the number of transmission output revolutions is abnormal on the basis of the result of said comparison; and
(e) performing shifting and lock-up control on the basis of the number of transmission output revolutions calculated from the number of transmission input revolutions and the gear ratio of the gear stage selected at the corresponding time, if an abnormality is determined to exist.

10. A method according to claim 9 further comprising detecting existence of an internal mechanical failure of said transmission by comparing the number of revolutions output from a transmission output sensor with the number of transmission output revolutions calculated from the number of transmission input revolutions and the gear ratio, if no abnormality is determined.

11. A method according to claim 9 wherein said determining step determines that a malfunction has occurred in the value representing the number of transmission output revolutions where there is no output of pulses from said output sensor while said input sensor continues to generate pulses.

* * * * *